April 21, 1970   H. M. TETRICK ET AL   3,507,322
APPARATUS FOR HANDLING PERISHABLE MATERIALS
Filed May 8, 1969   3 Sheets-Sheet 1
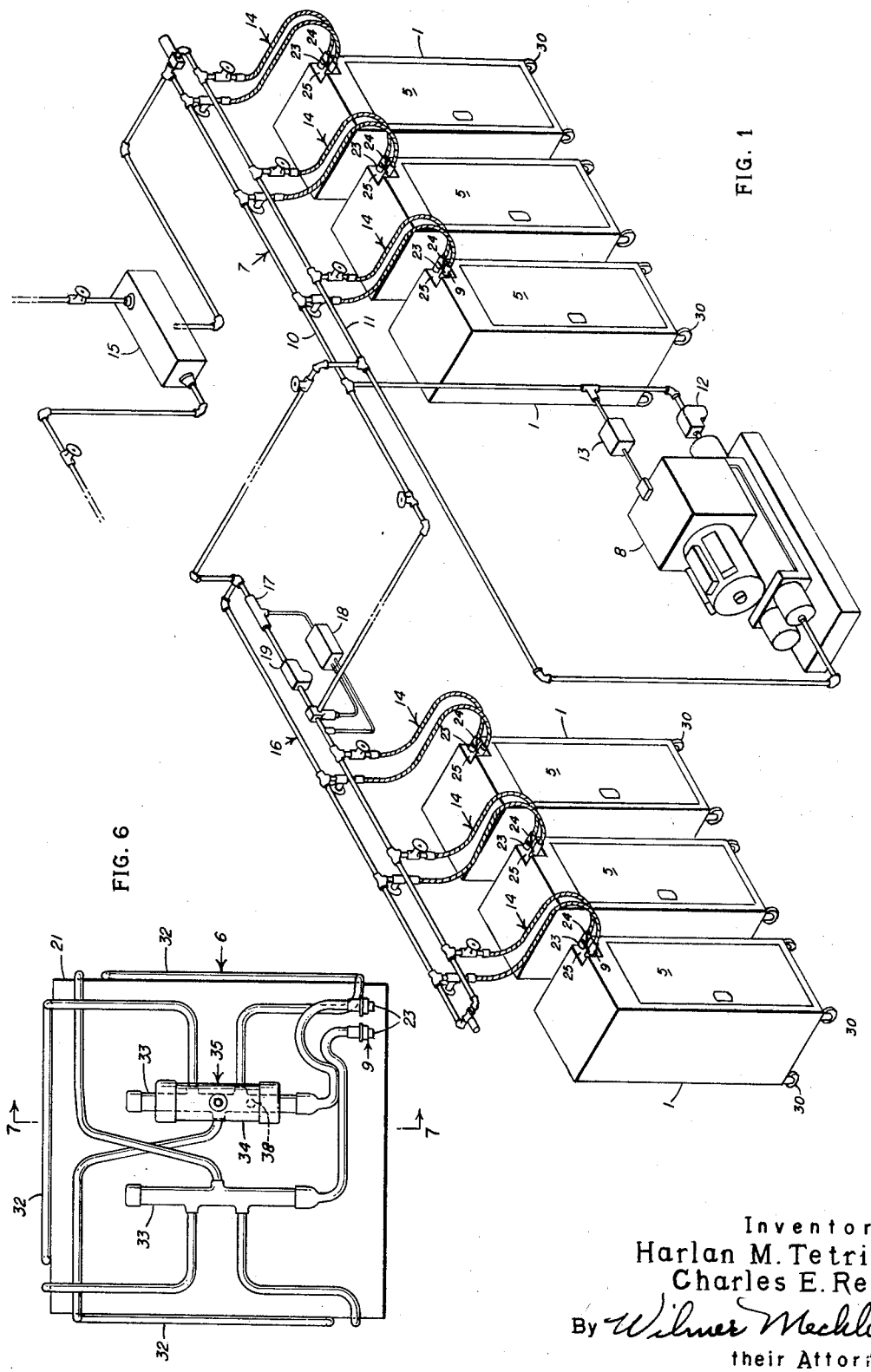
Inventors:
Harlan M. Tetrick
Charles E. Reed
By Wilmer Mecklin
their Attorney

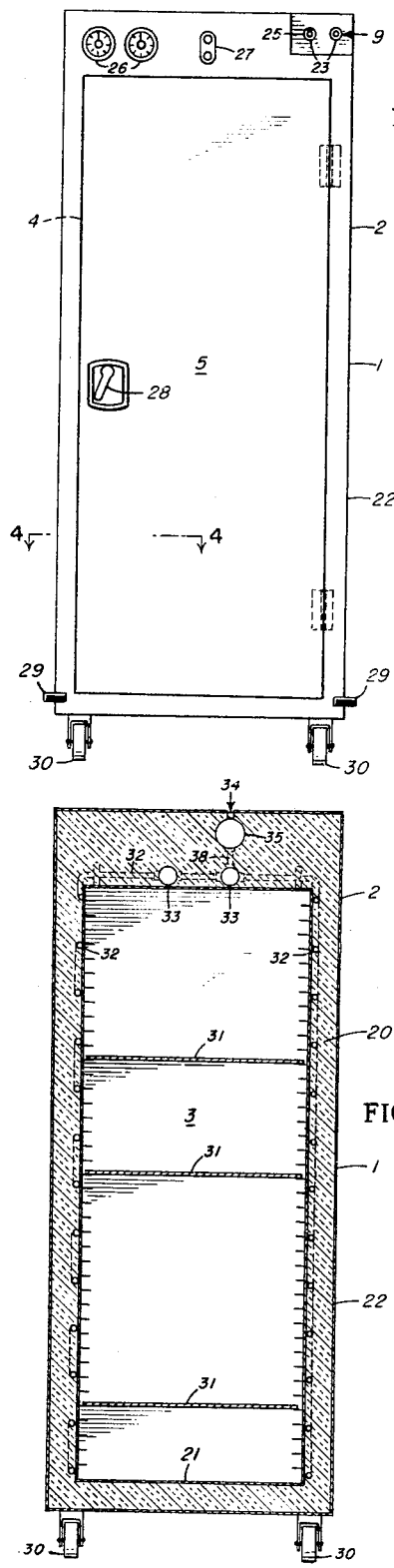

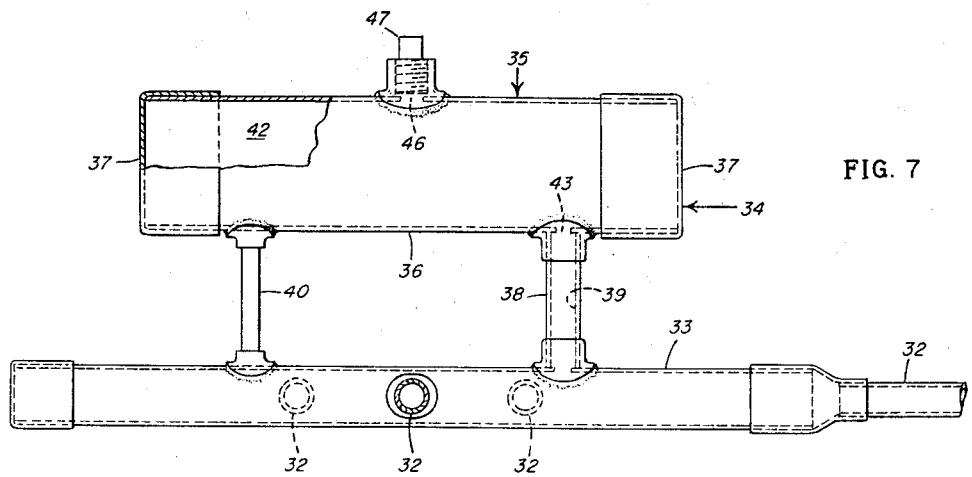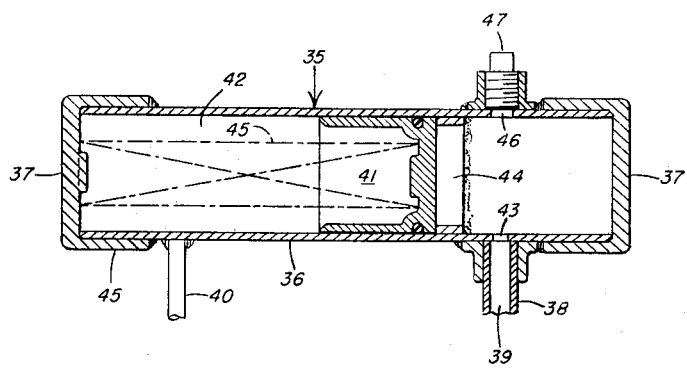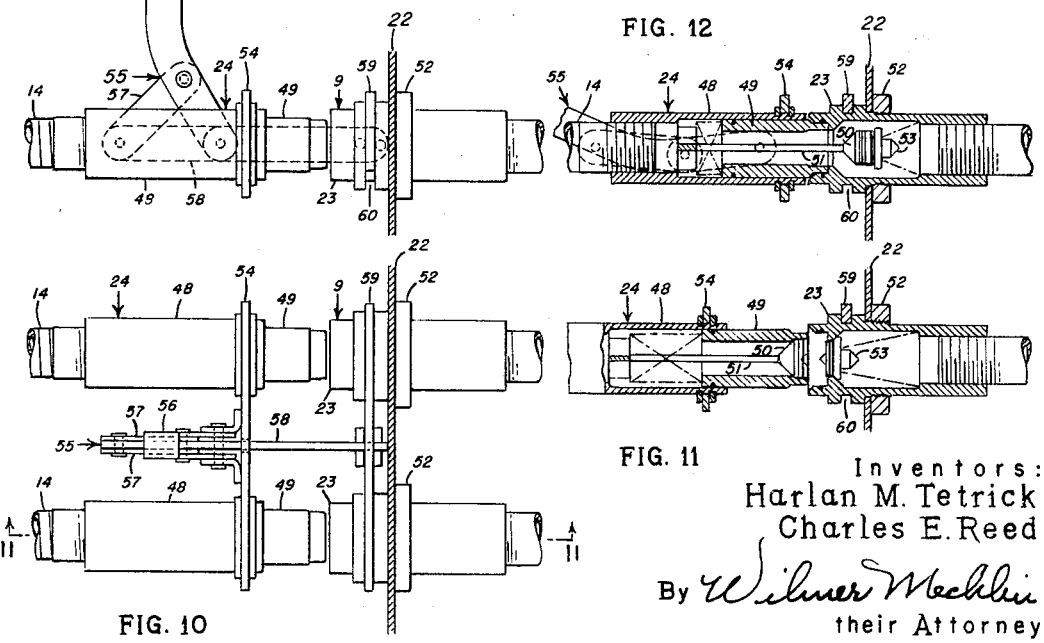

United States Patent Office 3,507,322
Patented Apr. 21, 1970

3,507,322
APPARATUS FOR HANDLING PERISHABLE
MATERIALS
Harlan M. Tetrick and Charles E. Reed, McLean, Va., assignors, by mesne assignments, to Freez-Porter Systems, Inc., Falls Church, Va., a corporation of Virginia
Continuation-in-part of application Ser. No. 629,653, Apr. 10, 1967. This application May 8, 1969, Ser. No. 823,122
Int. Cl. F28d 15/00; F25d 19/00
U.S. Cl. 165—61
10 Claims

ABSTRACT OF THE DISCLOSURE

Apparatus for handling perishable materials under controlled temperature conditions in storage and shipment, including a plurality of portable insulated containers, each fitted for controlling its internal temperature with a piping circuit for circulation of a liquid heat transfer medium, primary heat exchanger circuits separate from the container for supplying the liquid heat transfer medium thereto at selected temperatures, self-closing, quick disconnect couplings for releasably connecting each primary circuit to the piping circuit of each container, and a cushioning device in each piping circuit for cushioning any expansion of the liquid medium therein during periods in which the piping circuit is disconnected from the primary circuit for enabling the circuits to be connected under any conditions.

---

This application is a continuation-in-part of our copending application Ser. No. 629,653, filed Apr. 10, 1967.

BACKGROUND OF THE INVENTION

Portable insulated containers heretofore have been used for storing and shipping perishable materials under more or less controlled temperature conditions and in the French patent to Amiot, No. 1,004,267, published Mar. 27, 1952, it has been proposed to equip such containers with piping circuits connectible in plural for supply of a liquid or gaseous heat transfer medium to a common source circuit for producing refrigerating conditions within a container. However, while recognizing the desirability of self-closing, quick-disconnect couplings for releasably connecting the piping circuits thereof to a source circuit, it previously was not appreciated that, even with a liquid heat transfer medium, quick connection of a piping to a source circuit was practically impossible under certain, not unusual, conditions. It is to improved apparatus solving this and other problems confronted in handling perishable materials under controlled temperature conditions, that the present invention is directed.

SUMMARY OF THE INVENTION

The primary object of the present invention is to provide improved apparatus for handling perishable materials under controlled temperature conditions, wherein the materials are loaded in portable insulated containers fitted with piping circuits for circulation of a liquid heat transfer medium supplied by a separate primary heat exchanger circuit and the piping and primary circuits are quick connectible under all conditions.

Another object of the invention is to provide an improved portable insulated container fitting for use in the above-described apparatus with a piping circuit for circulation of a liquid heat transfer medium, which circuit not only is quick connectible at its terminals to a primary heat exchanger circuit but also includes means for cushioning any expansion of the liquid medium during intervals of disconnection from the primary circuit for enabling the piping circuit both to be connected under any conditions to the primary circuit and to be precharged with the liquid medium for minimizing the drain on the supply thereof in the primary circuit.

In each preferred embodiment, the improved apparatus is adapted to both store and ship perishable materials under controlled temperature conditions. The portable insulated containers of the apparatus are each fitted with a piping circuit through which is circulated a liquid heat transfer medium having a liquidus range covering the temperature range required in the operation of the particular apparatus. For circulating the liquid medium at selected temperatures through the piping circuits of the containers and thereby controlling the latters' interior temperatures, the apparatus depends on primary heat exchanger circuits separate from the containers and having take-offs to which terminals of the piping circuit of any container are releasably connectible by a self-closing quick coupling. An essential component of each piping circuit is a cushioning device for yieldably accommodating any expansion of the liquid medium in the piping circuit during the intervals in which the piping circuit is disconnected from a primary circuit, without loss of the liquid medium and with restoration of the capacity of the device to accommodate later expansions when its piping circuit is reconnected to a primary circuit. With its expansion device and quick coupling elements at its terminals, each piping circuit not only can be precharged with the liquid medium for substantially inhibiting any drain on the supply of the medium in any primary circuit to which the piping circuit is connected but also is quick couplable at all times to a primary circuit by preventing a substantial build-up of pressure within itself and consequent interference with coupling of the quick coupling elements at its terminals.

The foregoing and other objects and features of the invention will appear hereinafter in the detailed description, be particularly pointed out in the appended claims and be illustrated in the accompanying drawings, in which:

FIGURE DESCRIPTION

FIGURE 1 is an isometric, somewhat schematic view, showing for a preferred embodiment of the apparatus adapted for both storing and shipping perishable materials, an installation of a primary heat exchanger circuit with containers releasably connected thereto, particularly suitable for installation in an eating establishment;

FIGURE 2 is a front elevational view on a larger scale of one of the preferred containers shown somewhat schematically in FIGURE 1;

FIGURE 3 is a central vertical sectional view of the container of FIGURE 2 taken along a plane parallelling and looking toward its back;

FIGURE 4 is a fragmentary horizontal sectional view taken along lines 4—4 of FIGURE 2;

FIGURE 5 is a view on a further enlarged scale of the liner of the cabinet of FIGURE 2 with the piping circuit mounted thereon prior to encasement of the liner and circuit in insulating materials;

FIGURE 6 is a plan view of the sub-assembly of FIGURE 5;

FIGURE 7 is a fragmentary vertical sectional view on a further enlarged scale taken along lines 7—7 of FIGURE 6 showing an air-cushioned form of the expansion cushioning device suitable for inclusion in the piping circuit;

FIGURE 8 is a central vertical sectional view of an alternate, spring-cushioned form of the cushioning device;

FIGURE 9 is a fragmentary side elevational view on the scale of FIGURE 7, showing a clampable gang quick coupling, prior to clamping of the coupling elements in coupled position;

FIGURE 10 is a plan view of the coupling of FIGURE 9;

FIGURE 11 is a vertical sectional view taken along lines 11—11 of FIGURE 10; and FIGURE 12 is a view on the section of FIGURE 11, but with the elements clamped in coupled position.

DETAILED DESCRIPTION

Referring now in detail to the drawings in which like reference characters designate like parts, the improved apparatus of the present invention, while capable of storing or otherwise handling perishable materials under controlled temperature conditions at one location, is particularly adapted for handling perishable materials, such as previously refrigerated or frozen foods, which in the course of handling require shipment or transportation from one location to another. In such handling, the source or starting location may be a freezing plant, warehouse or other distribution center and the end location one or more retail grocery stores, restaurants or other destinations whose requirements of the materials are supplied in whole or part from the particular center.

The materials designed to be handled according to this invention may be any perishable materials, such as perishable foods, which in shipment from a source to a destination require a controlled temperature environment for their preservation. However, the primary present need is in the handling of frozen or refrigerated foods that are frozen or refrigerated at one location and shipped for sale, consumption or other use at one or more other locations. It therefore is with reference to such food handling that the improved apparatus will be particularly described as exemplary of the invention.

For any practical commercial application, the improved apparatus is comprised of a plurality of portable insulated containers or cabinets 1, each having an insulated casing or shell 2 containing or enclosing a hollow interior 3 accessible for loading and unloading through an access opening 4 normally closed by an insulated door or other closure member 5. Each container has or is fitted or equipped with a copper or other suitable heat conductive piping, tubing or coil circuit 6, which, conveniently, may be imbedded in its insulated casing 2 about its hollow interior 3, for transferring heat between its interior and a liquid heat transfer medium circulateed through the piping circuit. Unlike the usual refrigerators or freezers, the containers 1 are not self-contained heat transfer units equipped with individual chillers or heaters. Instead, they depend for the supply of the liquid heat transfer medium at the desired temperature upon connection to separate circuits 7, which, according to the temperature ranges demanded of them, are equipped with chillers, heaters or heater-chillers, herein termed generally "primary heat exchangers" and designated as 8, each of the capacity to supply and adapted for connection to a plurality of containers.

In the same or a given application, installation or system of the improved apparatus, for compatibility, the same liquid heat transfer medium should be used throughout and the piping circuit 6 of any of its containers 1 should be connectible to any of its primary heat exchanger circuits 7 and the connections between the piping and primary circuits should be so-called "quick-connects" or "quick-connect" couplings suited for rapid connection and disconnection. The location or position of any of the primary heat exchanger circuits 8 in the preferred application in which the improved apparatus is adapted for both storing and shipping perishable materials, will be selected to insure the desired control of the internal or interior temperature conditions in the containers between loading and unloading thereof. Thus, for storage at both a distribution center and a destination, there should be one or more primary heat exchanger circuits at each of these locations and, except for hauls of such short duration or under such ambient temperature conditions that the insulation of a container will suffice to maintain the temperature in its interior within the desired range, there also should be an appropriate number of primary heat exchanger circuits in the vehicles in which the containers are transported or at strategic locations along the route between the distribution center and any destination.

The flexibiliy of the improved apparatus in handling perishable materials probably is best demonstrated by its application to the handling of perishable foods. Ordinarily such foods will be frozen or refrigerated before loading into the containers at a distribution center, although it is also possible to reduce the temperature of the cooked foods within the containers after they have been loaded thereinto. However the frozen or refrigerated condition of the perishable foods with which a container is loaded is produced, that condition, within the broad or narrow temperature range suited for the particular foods, can and usually will be maintained by connecting the container, as necessary, to a primary heat exchanger circuit 7 supplying the liquid heat transfer medium under thermostatic control in the temperature range required and selected to produce that desired within the container. In such case the primary circuit 7 would have as its primary heat exchanger 8 a chiller for chilling a liquid heat transfer medium, as by heat exchange therebetween and an alternately liquid and gaseous primary refrigerant, such as "Freon," relative to which the liquid medium is a secondary refrigerant or medium. As shown in FIGURE 1, the primary circuit 7 has supply and return lines or pipes 10 and 11 respectively leading from and to the primary exchanger 8, with the usual pump 12 and thermostat 13 on the supply side of the primary exchanger, the former for pumping the liquid medium into the supply line at the desired operating pressure and the latter for controlling the temperature of the medium in that line. With the supply and return lines conveniently arranged in parallel beyond the primary exchanger, pairs of preferably flexible leads or take-offs 14, spaced along and connected ordinarily in parallel to the supply and return lines, permit the primary circuit to be connected to and supply simultaneously a plurality of the containers 1. Beyond the leads 14 the supply and return lines 10 and 11 are cross-connected to complete the circuit and also suitably connected to a reservoir 15 for automatically compensating for any loss of the liquid medium.

While like continued chilling may be practiced at a destination, if the particular destination is a restaurant and the foods with which any container is loaded have been pre-cooked completely in a central commissary before loading, the foods can be brought up to serving temperature within the container and thereafter served directly therefrom, by connecting the piping circuit 6 of that container to a primary circuit having a heater rather than a chiller as its primary heat exchanger 8. Alternately, uncooked or partly cooked foods with which any container is loaded can be brought up within the container to a mellowing temperature range and mellowed preparatory to initial or further cooking by connecting it either to a primary circuit supplying the secondary liquid medium or refrigerant in the required mellowing temperature range or, as in the exemplary installation of FIGURE 1, fully described in our copending application Ser. No. 629,653, to a branch mellowing circuit 16 connected off a primary chiller circuit and having its own heater 17, thermostat 18 and pump 19 for raising the chilled liquid medium received from the primary circuit to the mellowing range.

In the chiller version and particularly in the heater version of the primary circuit 7, the reservoir 15 will serve to both make up loss and accommodate any expansion of the liquid medium and at any location the primary circuit as a whole or its primary heat exchanger, as desired, can be either fixed or portable.

The liquid heat transfer medium or secondary medium should be the same throughout the same system of the apparatus to eliminate the need for purging any of the piping and primary circuits 6 and 7 and, since it must remain liquid in all parts of the system, the liquid medium for a particular system must be one having a liquidus range covering the entire temperature range employed in the system. For perishable foods, the freezing range at which the foods are frozen or at least held in frozen condition is usually from about −20° F. to about 10° F. while the intermediate, refrigerating or mellowing range ordinarily extends from about 10° F. to about 50° F. and the serving range for heated foods may span a range from about 120° F. to about 212° F. Even though a liquid refrigerating medium ordinarily is termed a "brine," a true brine or saline solution is impractical because of its corrosiveness. However, there are numerous liquids that are both non-corrosive and have suitable liquidus ranges and even meet the further ideal requirements of non-toxicity and a specific heat, specific gravity and viscosity approaching that of water. Thus, for a system concerned at most with freezing and refrigerating or mellowing with constant overall limits on its temperature range from −20° F. to 50° F., the liquid medium might be either methyl or ethyl alcohol. On the other hand, a system concerned in addition with heating and having an overall range of from −20° F. to 212° F., could not use the alcohols as their boiling points are too low, but could use liquids such as ethylene glycol or a silicone fluid now marketed by the General Electric Company under the designation S.F. 96–5, the latter having a liquidus range extending from around −20 F. to around 275° F. and at 77° F. at viscosity of 5 centistokes, specific gravity of 0.916 and specific heat of 0.36.

Devoid of the weight of an individual, in-built heat exchanger, each of the containers 1 of the improved apparatus is readily portable and may be of the size and shape best suited for the particular installation. The preferred container is of box or regular hexahedral-shape and both rigid and durable for continued use over a long period. As in the illustrated embodiment, the container usually will be of box or regular hexahedral shape and to minimize its bulk and weight relative to its capacity it will have both its casing 2 and door 5 made of the now usual thin, light-weight sandwich construction with a layer of polyurethane foam or like insulation 20 sandwiched between the liner 21 and a sheath or covering 22, the former for good heat conductivity suitably aluminum and the latter either metal or plastic. To simplify construction the liner 21 and piping circuit 6 may be formed as a sub-assembly with the piping circuit mounted on and fixed to the liner, as by making the liner double-walled with the tubing of the circuit printed or impressed therein. The casing of the basic cabinet is then completed by pouring, spraying or otherwise applying the insulation 20 to fill the space between the liner 21 and sheath 22.

In the completed cabinet the terminals or inlet and outlet ports of the piping circuit 6 are self-closing, quick-connect coupling elements releasably connectible to mating elements 24 at the terminals of the leads 14 of the primary circuit 7 and the elements on the container preferably are both protected and readily accessible by projecting into and being contained in a recess 25 in the face of the casing 2 above the access opening 4. Desirable additions present in the illustrated container, are internal temperature and piping circuit pressure gauges 26 and condition indicator lights 27 on the face of the casing 2 above the access opening 4, a keyed, handle-actuated lock 28 recessed in the door, bumpers 29 at sides of the casing 2 and, for mobility, wheels or casters 30, the last, if desired, retractible to facilitate stacking of the containers in either storage or shipment. It also is desirable that the container have adjustable shelving 31 to permit any desired compartmentation of its interior 3.

For full and efficient exposure of the interior 3 of the container 1 for heat transfer to the liquid medium circulated through its piping circuit 6, the preferred container has its piping circuit branched into a plurality of convoluted or sinuous branch pipes or coils 32, each substantially covering one of the sides and back of the liner 21, with the ends of each branch pipe each connected to one of the terminals 23 through one of the pair of headers 33 mounted on the top of the liner. The amount of the liquid medium required to charge or fill the piping circuit of each container therefore is substantial and the combined capacities of the number of containers required in even a small system would impose excessive demands upon the supply of the liquid medium at the one or more primary circuits 7 to which they were first connected. It therefore is highly desirable that the piping circuits 6 of the several containers of the system be precharged or prefilled before connection to any of the primary circuits 7 and that the latter's supply of the liquid medium be called upon only to compensate for any loss. As earlier pointed out, it not only is desirable but essential to the commercial practicability of the apparatus in handling perishable materials that the containers be quick-connectible to the primary circuits and that the quick-connect couplings 9 used for the purpose be self-closing on both sides when their elements are disconnected to minimize operating losses of any liquid medium.

With only the components heretofore described, a piping circuit 6 will operate satisfactorily while connected to a primary circuit 7 and under some other conditions. However, as we have discovered, such a piping circuit is detrimental to the operation of the apparatus under other conditions which almost inevitably will be met. The problem arises when a container is disconnected from a primary circuit in the presence of an ambient temperature substantially above the temperature at which the particular primary circuit supplies the liquid medium. In such case, despite the insulation in which the piping circuit is imbedded, there is an unexpectedly abrupt expansion of the liquid medium in the primary circuit, which, even in a brief interval of disconnection, increases the pressure in the piping circuit to the point where coupling of the piping circuit to the same or another primary circuit is difficult if not impossible because of the resistance to opening of the coupling elements on the piping circuit. Thus, when a container connected to a primary circuit supplying the liquid medium at −10° F. under an operating pressure of 30 p.s.i. and exposed exteriorly to an ambient temperature of 70° F., was disconnected therefrom, within three minutes the pressure in the piping circuit of the container was discovered to have increased to 500 p.s.i., with the result that the piping and primary circuits could not be reconnected. Thereafter, the pressure continued to incease and within a short time had reached the limit of the testing gauge, thereby adding to the problem of reconnection the risk of bursting of the piping circuit. A pressure relief valve offered a possible solution but only with an unacceptable loss of the liquid medium in the piping circuit. The problem was finally solved by including in the piping circuit a device which not only accommodated any expansion of the liquid medium but cushioned the expansion and returned the capacity of the piping circuit to normal on its next connection to a primary circuit.

Two possible forms of the cushioning device are illustrated the drawings, one in FIGURE 7 and the other in FIGURE 8 and both designated generally as 34. In each of the illustrated forms, the expansion or pressure cushioning device 34 has a tank 35 suitably formed of a cylindrical tube 36 permanently closed at its ends by end caps 37 welded thereto. The tank 35 in each conveniently is mounted on one of the headers 33 and fluid-connected thereto at all times by a hollow open-ended post or column 38 supporting an end portion of the tank and having a hollow bore 39 opening into that end portion and also into the header. A second post or stanchion 40 supports the opposite end portion of the tank on the header and in the form of FIGURE 7 may also serve as a fluid connection but usually will not perform this function. In the form of that figure, the tank 35 contains no structure and depends on a filling or content of air or other gas, preferably both inert to and immiscible with the liquid medium used in the particular apparatus, for yieldably accommodating or cushioning any expansion of the liquid medium.

In the alternate form of FIGURE 8, the yieldable resistance or cushioning of any thermal expansion of the liquid heat transfer medium is provided by a piston 41 slidable or reciprocable longitudinally in the preferably cylindrical chamber 42 in the tank 35 and suitably peripherally gasketed for sealing contact with the side thereof. Slidable from one end of the chamber 42 toward the inlet port 43 thereinto for the liquid medium, the piston 41 is stopped or limited in its movement short of that point, conveniently by an annular stop or stop ring 44 fixed in the chamber. Normally, the piston 41 is yieldably held against the stop 44 by a suitable yieldable means, such as the illustrated return spring 45, under a pressure which preferably is substantially the same as the normal operating pressure of any of the primary circuits in the particular application of the improved apparatus. In the form of FIGURE 7 the gas pressure of the compressible gaseous medium it contains normally should be of substantially the same order and, if not otherwise, the gas will be so pressurized when the piping circiut is first connected to any of the primary circuits.

If, as illustrated, the tank 35 of either form is mounted at a level above the balance of the piping circuit, it conveniently may have in the top a bleed port 46, normally closed by plug 47 accessible through the top of the casing 2 for bleeding air from the rest of the circuit as the latter is charged or filled. Also, if open until the final stage of the charging, the port 46 enables it to be visually determined when the rest of the piping circuit is charged with the liquid medium by observing the arrival of the latter at the liquid inlet port 43. Whatever the form of the cushioning device, its residual or excess capacity for the liquid medium beyond its normal or operating pressure capacity, must be such, relative to the capacity of the remainder of the piping circuit, as to accommodate any thermal expansion of the liquid medium over the full temperature range of the latter in the particular application of the apparatus. So capacitied, the cushioning device effectively prevents any thermal expansion of the liquid medium in the piping circuit from producing a pressure increase sufficient to interfere with connection of the piping circuit at any time to a primary circuit.

So long as they are self-closing and fluid-tight under the relatively low pressures to which they are subjected in service, the quick-connect fluid couplings 9 for connecting the piping circuit 6 of the containers 1 to the primary heat exchanger circuit 7, may be of any suitable type. However, a type particularly preferred as enabling the pair of terminals 23 of the piping circuit to be connected simultaneously to a pair of the leads 14 off the supply and return lines 10 and 11 of a primary circuit 7, is that illustrated in FIGURES 9–12. As there shown, each of the coupling elements 24 on the pair of leads 14 has a collar 48 fitted onto the leads, a hollow plunger 49 yieldably telescoping into the front end of the collar and an external plug or stopper 50 mounted forwardly of the plunger on a central stem 51 projecting through the plunger and anchored to the collar and automatically closing the front end of the plunger when the coupling element is uncoupled. The mating elements 23 serving as the terminals of the piping circuit, each have a fixed collar 52, normally closed by an internal spring-pressed plug or stopper 53. In the coupling operation, the plunger 49 of the element 24 is pushed or inserted into the front end of the collar 52 of the mating element 2. in process retracting the plunger from its plug 50 and causing the latter to push the plug 53 into open position within the collar 52. For a simultaneous coupling of these pairs of mating elements the lead coupling elements 24 have their collars 48 connected in the same lateral spacing as the collars 52 of the fixed elements 23 of the piping circuit 6 by a connecting or cross-plate 54. A toggle clamp 55 mounted on the connecting plate 54 between the collars 48, has as one leg of the toggle the lower part of a bent handle 56 pivoted to the plate and as the other leg a link 57 pivoted at one end to the handle and at the other to the rear end of a draw bar 58 slidable in and projecting forwardly through the connecting plate and carrying at the front a yoke 59 adapted to straddle and releasably seat at opposite sides in peripheral slots 60 in the fixed terminal collars 52. With the yoke so seated and the mating coupling elements aligned, swinging of handle downwardly to extend the toggle pushes the coupling elements 23 into the mating terminal elements 24 and, by swinging the handle beyond center, effectively clamps the several elements in coupled relation. Uncoupling simply requires the handle to be swung to release position for releasing the clamping pressure so that the coupling elements 23 can the withdrawn and the yoke 59 disengaged.

From the above detailed description it will be apparent that there has been provided improved apparatus for handling perishable materials in which the materials are stored and shipped in portable insulated containers connectible for supply of a liquid heat transfer medium to one or more strategically located primary heat exchanger circuits and so connectible under all conditions. It should be understood that the described and disclosed embodiment is merely exemplary of the invention and that all modifications are intended to be included that do not depart from the spirit of the invention and the appended claims.

Having now described our invention, we claim:

1. Apparatus for handling perishable materials under controlled temperature conditions comprising a portable insulated container for containing said materials, a piping circuit in said container for circulation of a liquid heat transfer medium therethrough, self-closing quick-connect coupling elements at terminals of said piping circuit and couplable for supply of said liquid medium to said piping circuit at circulating pressure and within a selected temperature range to mating coupling elements of a primary heat exchanger circuit separate from said container, and cushioning means in said piping circuit for yieldably accommodating any thermal expansion of the liquid medium in said piping circiut during intervals of disconnection thereof from such a primary circiut and thereby holding the pressure in said piping circuit within a range over which the coupling elements at the terminals thereof are couplable with said mating elements.

2. Apparatus according to claim 1, including a primary heat exchanger circuit separate from the container for supplying the liquid medium to the piping circuit thereof at circulating pressure and within a selected temperature range and having therefor mating self-closing quick-connect coupling elements couplable to the coupling elements at the terminals of the piping circuit.

3. Apparatus according to claim 2, wherein the primary circuit is connectible at the same time to a plurality of the containers for simultaneously supplying the liquid medium thereto.

4. Apparatus according to claim 3, wherein the handling includes storing the perishable materials at a distribution center and any of a plurality of destinations and shipment therebetween, there are a plurality of containers each containing materials loaded therein at the distribution center until unloading thereof at a destination, there are a plurality of primary circuits, and the primary circuits are so located relative to the distribution center and destination as by selective connection thereto of the piping circuit of a container to enable the temperature conditions within the container to be controlled from loading to unloading thereof.

5. Apparatus according to claim 4, wherein each container is precharged with the liquid medium.

6. Apparatus according to claim 1, wherein the cushioning means includes a contained chamber fluid-connected in the piping circuit, and means for yieldably increasing the capacity of the chamber to accommodate the thermal expansion of the liquid medium in the piping circuit.

7. Apparatus according to claim 6, wherein the piping circuit of the container is charged with the liquid medium prior to connection thereof to any such primary circuit.

8. Apparatus according to claim 7, wherein the yieldable means is a gaseous medium.

9. Apparatus according to claim 7, wherein the yieldable means is a piston slidable in and sealingly engaging a side of the chamber and yieldably urged under a predetermined return pressure in a direction opposing expansion of the liquid medium in the piping circuit.

10. Apparatus according to claim 6, wherein the chamber is constantly fluid-connected to the rest of the piping circuit for flow of the liquid medium therebetween and in operation is closed against escape therethrough of the liquid medium in the piping circuit.

References Cited

UNITED STATES PATENTS

| | | | |
|---|---|---|---|
| 2,518,299 | 8/1950 | Fernandez | 62—299 |
| 2,550,040 | 4/1951 | Clar | 62—371 X |
| 2,585,360 | 2/1952 | Williams | 62—237 |
| 2,815,938 | 12/1957 | Impey et al. | 165—107 X |
| 2,825,338 | 3/1958 | Schnepf et al. | 62—237 X |

ROBERT A. O'LEARY, Primary Examiner

A. W. DAVIS, JR., Assistant Examiner

U.S. Cl. X.R.

62—237, 299, 448; 165—76, 81, 107, 136, 138